(12) United States Patent  
Guo

(10) Patent No.: US 8,947,363 B2
(45) Date of Patent: Feb. 3, 2015

(54) ADJUSTABLE KEYBOARD AND ELECTRONIC DEVICE EMPLOYING ADJUSTABLE KEYBOARD

(71) Applicants: Fu Tai Hua Industry Co., Ltd., Shenzhen (CN); Hon Hai Precision Industry Co., Ltd., New Taipei (TW)

(72) Inventor: Ji-Bing Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 199 days.

(21) Appl. No.: 13/737,945

(22) Filed: Jan. 10, 2013

(65) Prior Publication Data

US 2013/0181906 A1   Jul. 18, 2013

(30) Foreign Application Priority Data

Jan. 12, 2012 (CN) .......................... 2012 1 0008077

(51) Int. Cl.
*G09G 5/00* (2006.01)
*G06F 3/02* (2006.01)

(52) U.S. Cl.
CPC ................................. *G06F 3/0208* (2013.01)
USPC ..................... 345/169; 361/679.12

(58) Field of Classification Search
USPC ................. 345/168–172; 361/679.11, 679.12
See application file for complete search history.

(56) References Cited

U.S. PATENT DOCUMENTS

2007/0120033 A1* 5/2007 Lee .......................... 248/346.03
2008/0144263 A1* 6/2008 Loughnanae et al. ........ 361/680
2009/0279238 A1* 11/2009 Kobayashi et al. ...... 361/679.09

* cited by examiner

*Primary Examiner* — Premal Patel
(74) *Attorney, Agent, or Firm* — Novak Druce Connolly Bove + Quigg LLP

(57) ABSTRACT

A keyboard includes an upper frame, a main body, a lower frame, and an adjustment mechanism. The two frames cooperate with each other to sandwich the main body. The lower frame includes a bottom plate defining a though hole. The adjustment mechanism is configured to adjust an inclined angle of the keyboard, and includes an adjustment member, a supporting member, a driving member and a position stopper. The adjustment member is operated by a user. The supporting member protrudes from the bottom plate via the through hole to support the keyboard on a supporting surface. The driving member drives the supporting member to move along a central axis of the through hole to adjust a protruding distance of the supporting member when the adjustment member is operated. The position stopper resists the supporting member to secure the supporting member when the adjustment member is free.

20 Claims, 8 Drawing Sheets

ADJUSTABLE KEYBOARD AND ELECTRONIC DEVICE EMPLOYING ADJUSTABLE KEYBOARD

BACKGROUND

1. Technical Field

The present disclosure relates to keyboards and in particular to adjustable keyboards and electronic devices employing the adjustable keyboards.

2. Description of Related Art

Portable electronic devices, such as personal computers and notebooks, are equipped with keyboards to be used as basic input devices. However, many keyboards can only maintain a single predetermined inclined angle with respect to a support apparatus (such as a desk), and cannot be adjusted to different angles, which can be inconvenient for users.

What is needed is to provide a keyboard that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will be made to the drawings to describe certain exemplary embodiments of the present disclosure.

Figure 1:
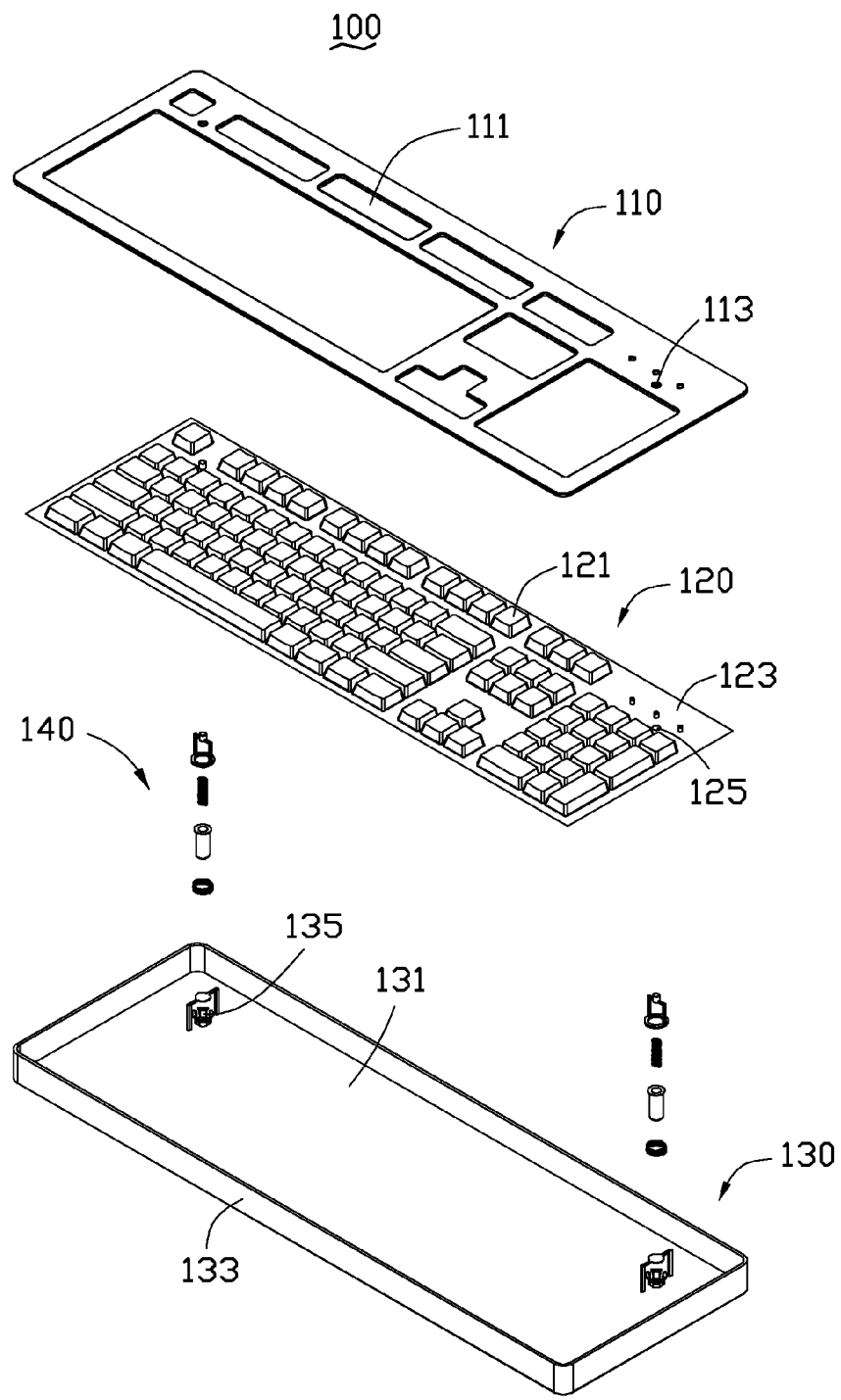
FIG. 1 is an exploded view of a keyboard according to one embodiment of the present disclosure, the keyboard including two adjustment mechanisms.
Figure 2:
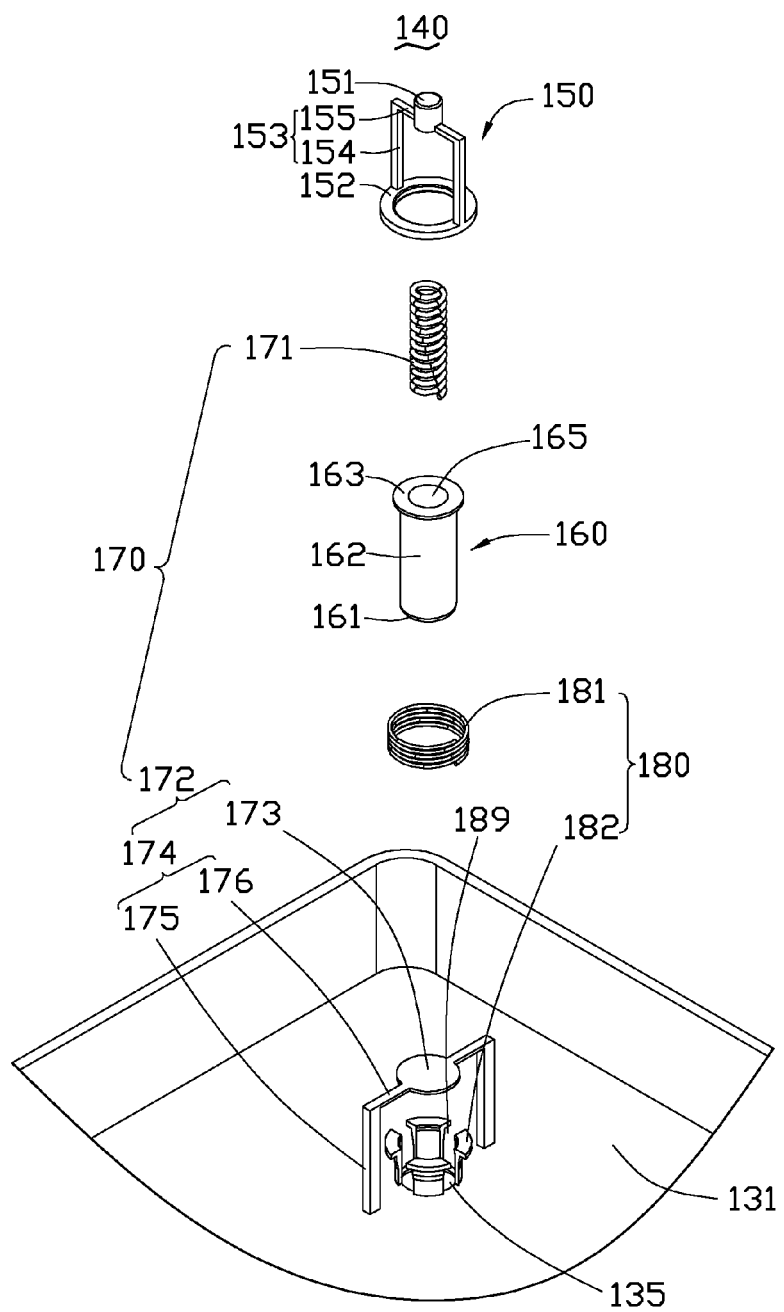
FIG. 2 is an enlarged exploded view of the adjustment mechanism of the keyboard of FIG. 1.
Figure 3:
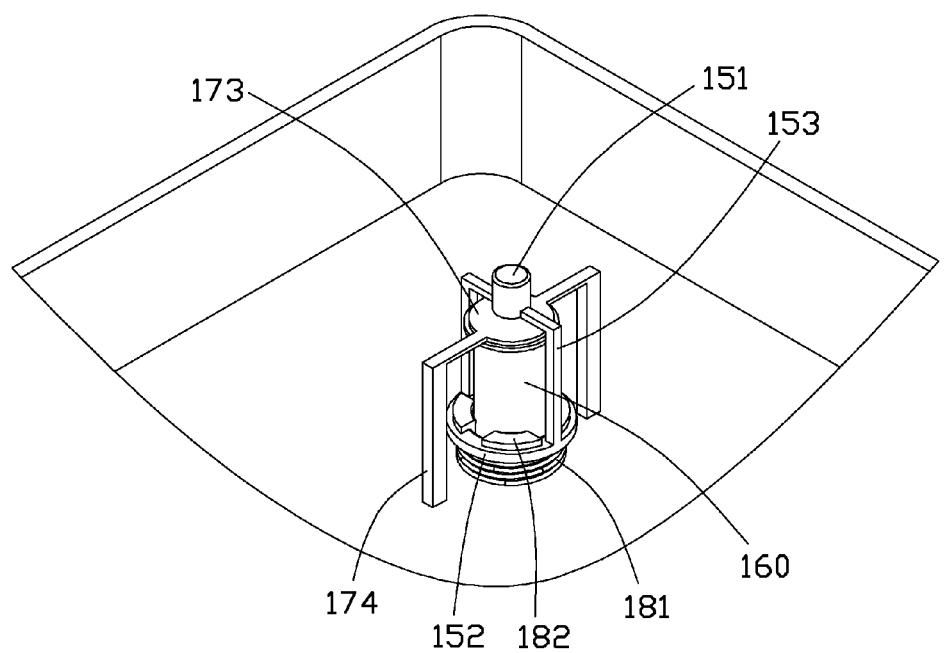
FIG. 3 is an assembled view of the adjustment mechanism of FIG. 2.

An exemplary embodiment of the present disclosure provides a keyboard 100. FIG. 1, FIG. 2 and FIG. 3 show that the keyboard 100 includes an upper frame 110, a main body 120 having a substrate 123 and a plurality of keys 121 fixed on the substrate 123, a lower frame 130, and two adjustment mechanisms 140. The upper frame 110 and the lower frame 130 define a receiving space to receive the main body 120, and the upper frame 110 and the lower frame 130 fastens the main body 120 between the upper frame 110 and the lower frame 130. The two adjustment mechanisms 140 are configured to adjust an inclined angle of the keyboard 100.

The upper frame 110 includes a plurality of first openings 111 used to expose the keys 121 through the upper frame 110 and two second openings 113 used to expose a part of the two adjustment mechanisms 140. The substrate 123 can be a printed circuit board (PCB), and includes two third openings 125 corresponding to the two second openings 113. The lower frame 130 includes a bottom plate 131 and a plurality of side walls 133 extending perpendicularly from edges of the bottom plate 131. The bottom plate 131 defines two through holes 135 corresponding to the two adjustment mechanisms 140.

Figure 4:
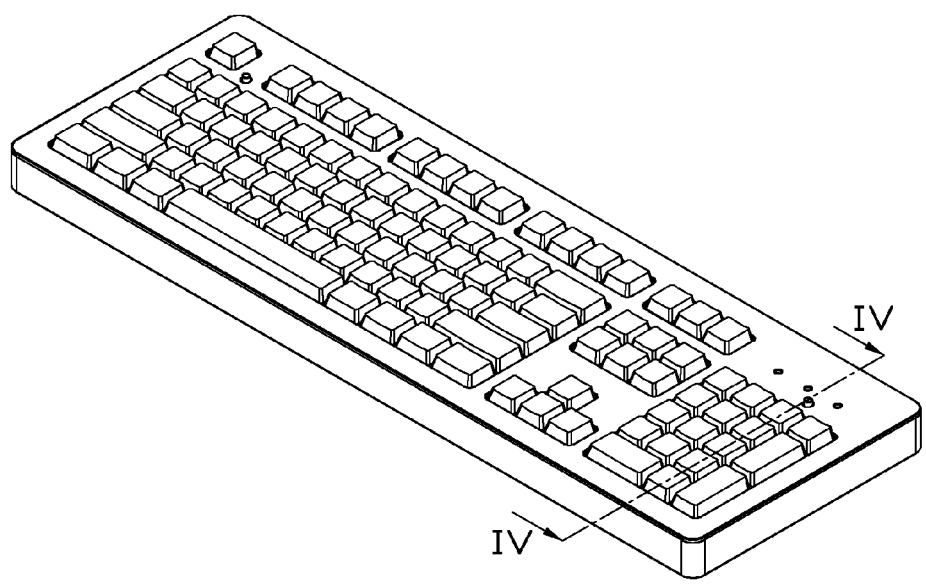
FIG. 4 is an assembled view of the keyboard of FIG. 1.
Figure 5:
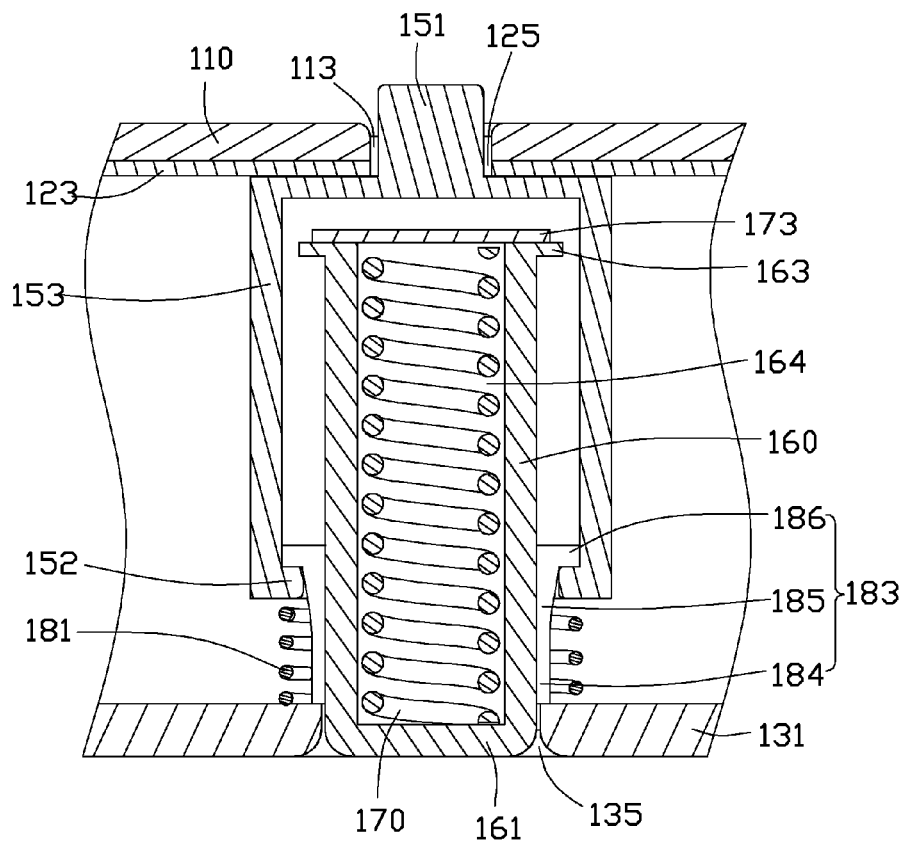
FIG. 5 is a cross-sectional view of the keyboard of FIG. 4 taken along line IV-IV.

FIG. 4 and FIG. 5 show that the two adjustment mechanisms 140 are fastened on the bottom plate 131 and are partly exposed via the third openings 125 and the second openings 113. The two adjustment mechanisms 140 are positioned at two opposite sides of the keyboard 100 to balance the keyboard 100. Each adjustment mechanism 140 includes an adjustment member 150, a supporting member 160, a driving member 170, and a position stopper 180. A user may operate the adjustment member 150 to adjust the inclined angle of the keyboard 100. The supporting member 160 protrudes from the bottom plate 131 via the through hole 135 to support the keyboard 100 at different inclinations on a supporting surface (such as a desktop). The driving member 170 drives the supporting member 160 to move along a central axis of the through hole 135 adjusting a protruding distance of the supporting member 160. The position stopper 180 resists the supporting member 160 to fasten the supporting member 160 when the supporting member 160 supports the keyboard 100.

The driving member 170 includes a first elastic element 171 and a positioning unit 172. The positioning unit 172 is fastened on the upper frame 110 or the lower frame 130, and the first elastic element 171 is located between the positioning unit 172 and the supporting member 160. In one embodiment, the positioning unit 172 includes a top plate 173 and a connection portion 174. The top plate 173, which may be a round shaped plate, is positioned above the through hole 135 parallel to the bottom plate 131. The connection portion 174 is connected between the top plate 173 and the bottom plate 131, and includes two L shaped link levers both including a first bar 175 perpendicular to the bottom plate 131 and a second bar 176 parallel to the bottom plate 131. The two second bars 176 are connected at two ends of the top plate 173, and each second bar 176 is connected between the top plate 173 and the first bar 175. The two first bars 175 are located on two sides of the through hole 135, and each first bar 175 is connected between the second bar 176 and the bottom plate 131. The first elastic element 171 is located between the top plate 173 and the supporting member 160 and is positioned below the top plate 173. In the embodiment, the first elastic element 171 is a spring.

The supporting member 160 is positioned below the top plate 173. In the embodiment, the supporting member 160 is a hollow cylindrical pillar, and includes a round bottom plate 161, and a side wall 162 which extends perpendicularly from the bottom plate 161. The round bottom plate 161 and the side wall 162 define a receiving space 164 and a fourth opening 165 opposite to the bottom plate 161. The receiving space 164 receives the first elastic element 171 via the fourth opening 165 between the bottom plate 161 and the top plate 173. The supporting member 160 further includes an extending portion 163 extending from an end of the side wall 162 adjacent to the fourth opening 165 and parallel to the bottom plate 161. The extending portion 163 is located between the side wall 162 and the top plate 173.

The position stopper 180 includes a second elastic element 181 and an elastic clamp unit 182. The elastic clamp unit 182 is arranged around the supporting member 160 and is configured to clamp the supporting member 160 to secure the supporting member 160 when the adjustment member 150 is free. In one embodiment, the elastic clamp unit 182 includes a plurality of clamp arms 183 each arm extending perpendicularly from an edge of the bottom plate 131 around the through hole 135 to the upper frame 110. An interval 189 is defined between two adjacent clamp arms 183. Each clamp arm 183 includes a connection portion 184, a clamp portion 185, and an extending portion 186. The connection portion 184 is connected between the bottom plate 131 and the clamp portion 185, and the clamp portion 185 is connected between the connection portion 184 and the extending portion 186. A thickness of the clamp portion 185 is slightly greater than a thickness of the connection portion 184. The extending portion 186 extends from an end of the clamp portion 185 away from and is parallel to the bottom plate 131. The second elastic element 181 is a spring around the clamp arms 183.

The adjustment member 150 includes an adjustment portion 151, a connection portion 153, and a fastening portion 152. The adjustment portion 151 is positioned above the top plate 173 and is exposed through the upper frame 110 via the third opening 125 and the second opening 113. In one embodiment, the adjustment portion 151 is an adjustment button and passes through the third opening 125 and the second opening 113 being exposed through the upper frame 110. The connection portion 153 is connected between the adjustment portion 151 and the fastening portion 152, and includes two L shaped link levers each link lever having a third bar 154 perpendicular to the bottom plate 131 and a fourth bar 155 parallel to the bottom plate 131. The two fourth bars 155 are connected to diametrically opposite sides of the adjustment portion 151, and each fourth bar 155 is connected between the adjustment portion 151 and the third bar 154. The two third bars 154 are connected to the diametrically opposite sides of the fastening portion 152, and each third bar 154 is connected between the fourth bar 155 and the fastening portion 152. The fastening portion 152 is positioned around the elastic clamp unit 182 and configured to clamp the elastic clamp unit 182, fastening the supporting member 160. The fastening portion 152 is a ring shape and located between the second elastic element 181 and the extending portion 186.

When the keyboard 100 is in a first state as shown in FIG. 5, the adjustment portion 151 protrudes from the upper frame 110 of the keyboard 100, and the supporting member 160 is fully received in the receiving space defined by the upper frame 110 and lower frame 120. Furthermore, the extending portion 163 abuts the top plate 173, the first elastic element 171 is connected between the top plate 173 and bottom plate 161 and is compressed, and the fastening portion 152 is positioned round the clamp portion 185 such that the elastic clamp unit 182 clamps the supporting member 160 with the clamp arms 183.

Figure 6:
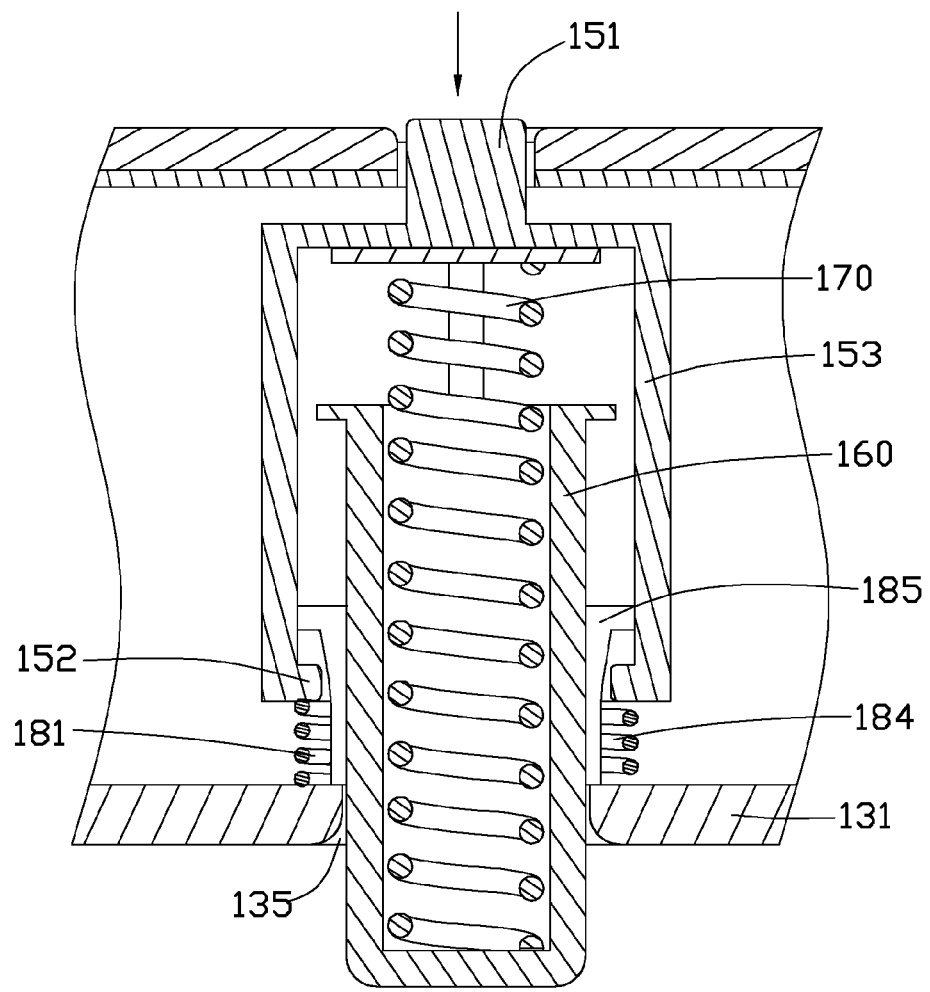
FIG. 6 is another view of part of the keyboard of FIG. 5, but showing the adjustment mechanism with the keyboard of FIG. 1 capable of being adjusted to an inclined angle.

FIG. 6 shows that when the adjustment portion 151 is pressed down by the user, the fastening portion 152 slides down to release the clamp portions 185 of the clamp arms 183, the second elastic element 181 is compressed, and then the clamp arms 183 releases the supporting member 160. Accordingly, the first elastic element 171 recovers and drives the supporting member 160 to move down and protrude from the bottom plate 131.

Figure 7:
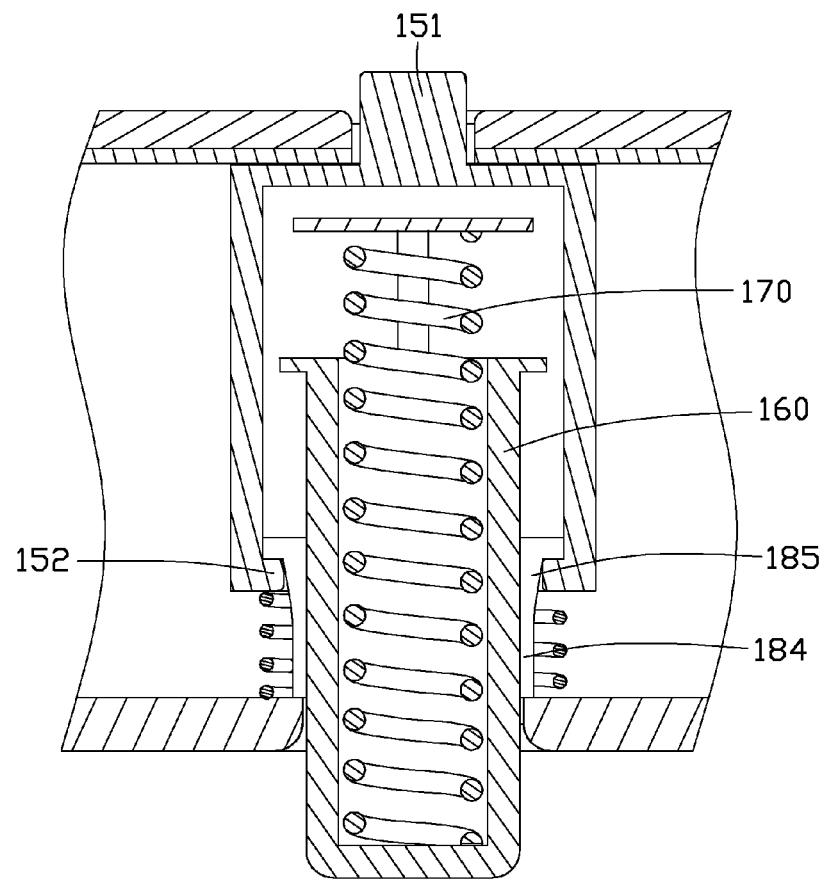
FIG. 7 is yet another view of part of the keyboard of FIG. 5, but showing the adjustment mechanism after being adjusted to the inclined angle.

FIG. 7 shows that when the supporting member 160 protrudes a desired distance, the adjustment portion 151 is released by the user, and the second elastic element 181 recovers and drives the fastening portion 152 to move up. Accordingly, the fastening portion 152 slides up to be positioned bounding the clamp portion 185, the elastic clamp unit 182 drives the supporting member 160 with the clamp arms 183 to clamp the supporting member 160 and stop the movement thereof. In the embodiment, the adjustment portion 151 protrudes from the upper frame 110 of the keyboard 100.

In summary, the keyboard 100 includes the adjustment mechanism 140 which is able to adjust the distance the supporting member 160 protrudes when the keyboard 100 is positioned on a supporting surface, thus the keyboard 100 can hold different inclinations, which can be adjusted.

Figure 8:
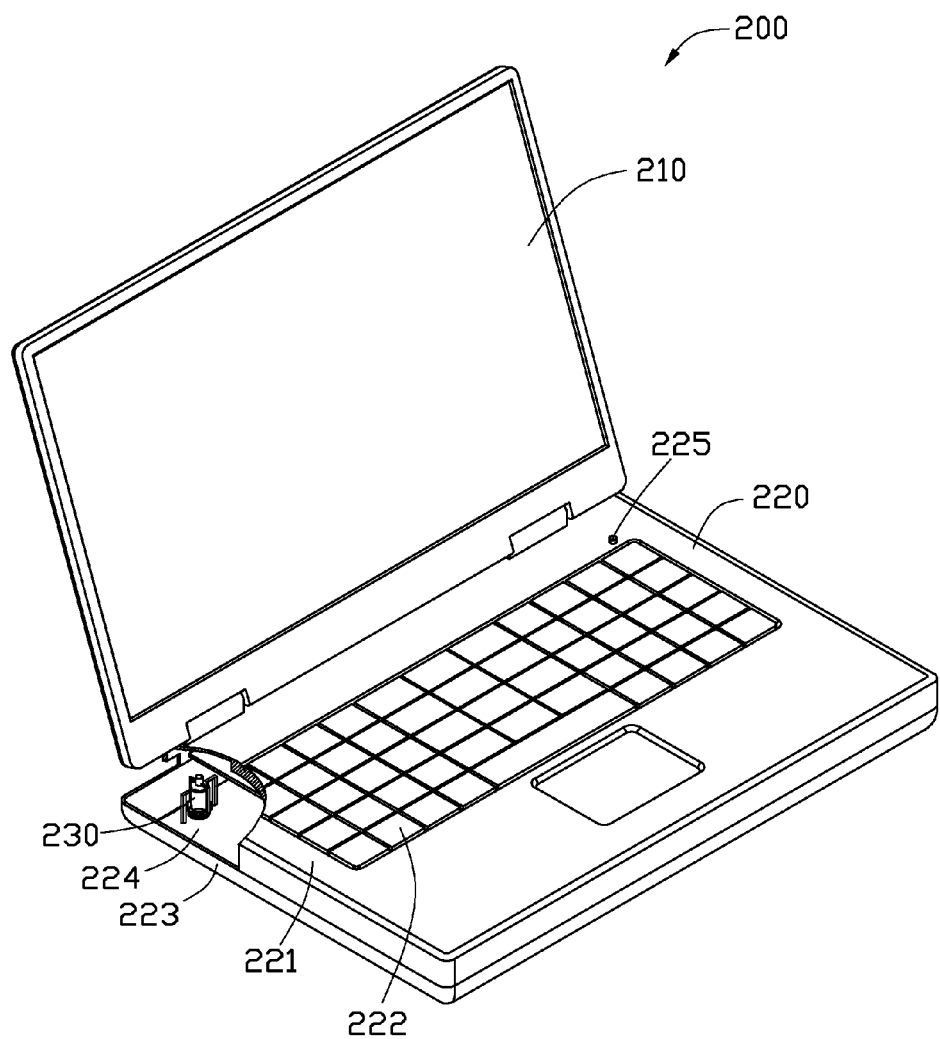
FIG. 8 is an isometric view of an electronic device employing the keyboard of FIG. 1 according to one embodiment of the present disclosure.

FIG. 8 shows that an electronic device 200 includes a display 210 and a keyboard 220 pivotably connected to the display 210. In the embodiment, the electronic device 200 is a laptop computer.

The keyboard 220 is similar to the keyboard 100 shown in FIG. 1. The keyboard 220 includes an upper frame 221, a lower frame 223, and a main body 222. The main body 222 is sandwiched between the upper frame 221 and the lower frame 223. The upper frame 221 defines a first opening (not labeled), a plurality of keys are exposed through the upper frame 221 via the first opening. The lower frame 223 includes a bottom plate 224 for loading the main body 222. The bottom plate 224 defines a through hole (not labeled), and the upper frame 221 defines a second opening 225 corresponding to the through hole.

The keyboard 220 further includes an adjustment mechanism 230 used to adjust the angle of the keyboard 220. The adjustment mechanism 230 is arranged between the upper frame 221 and the lower frame 223. The adjustment mechanism 230 is fastened in the through hole and the second opening 225. Two ends of the adjustment mechanism 230 are exposed through the keyboard 220 via the through hole and the second opening 225, correspondingly. In the embodiment, the keyboard 220 includes two adjustment mechanisms 230 at two opposite sides of the keyboard 220 to level the electronic device 200. The structure and operating manner of the adjustment mechanism 230 is similar to the adjustment mechanism 140.

It is to be further understood that even though numerous characteristics and advantages of preferred and exemplary embodiments have been set out in the foregoing description, together with details of the structures and functions of the embodiments, the disclosure is illustrative only; and changes may be made in detail, especially in matters of shape, size and arrangement of parts within the principles of the present disclosure to the full extent indicated by the broad general meaning of the terms in which the appended claims are expressed.

What is claimed is:

1. A keyboard, comprising:
an upper frame comprising a plurality of first openings;
a main body having a plurality of keys exposed from the upper frame via the plurality of first openings;
a lower frame cooperating with the upper frame to fix the main body between the upper frame and the lower frame, the lower frame comprising a first bottom plate defining a though hole; and
an adjustment mechanism fixed on the bottom plate and configured to adjust an inclined angle of the keyboard, the adjustment mechanism comprising:
an adjustment member configured to be operated by a user;
a supporting member configured to protrude from the first bottom plate via the through hole to support the keyboard on a supporting surface;
a driving member configured to drive the supporting member to move along a central axis of the through hole to adjust a protruding distance of the supporting member when the adjustment member is operated; and a position stopper configured to resist the supporting member to secure the supporting member when the adjustment member is free.

2. The keyboard of claim 1, wherein the driving member comprises a positioning unit and a first elastic element, the positioning unit is fixed on the upper frame or the lower frame, and the first elastic element is located between the positioning unit and the supporting member.

3. The keyboard of claim 2, wherein the positioning unit comprises a top plate positioned above the through hole and parallel to the first bottom plate and a first connection portion connected between the top plate and the first bottom plate.

4. The keyboard of claim 3, wherein the first connection portion comprises two L shaped link levers each link lever having a first bar perpendicular to the first bottom plate and a second bar parallel to the first bottom plate, each second bar is connected between the top plate and the first bar, and each first bar is connected between the second bar and the first bottom plate.

5. The keyboard of claim 3, wherein the supporting member comprises a second bottom plate, a side wall extending perpendicularly from the second bottom plate, a receiving space defined by the second bottom plate and the side wall, and an opening opposite to the second bottom plate, and the receiving space receiving the first elastic element via the opening.

6. The keyboard of claim 5, wherein the supporting member further comprises an extending portion extending perpendicularly from an end of the side wall adjacent to the opening and parallel to the second bottom plate.

7. The keyboard of claim 3, wherein the position stopper comprises a second elastic element and an elastic clamp unit, the elastic clamp unit is arranged around the supporting member and configured to clamp the supporting member to fasten the supporting member when the adjustment member is free, and the second elastic element is a spring around the clamp unit.

8. The keyboard of claim 7, wherein the elastic clamp unit comprises a plurality of clamp arms each arm extending from an edge of the first bottom plate around the through hole to the upper frame, an interval is defined between two adjacent clamp arms, each clamp arm comprises a second connection portion and a clamp portion, and the second connection portion is connected between the first bottom plate and the clamp portion.

9. The keyboard of claim 8, wherein a thickness of the clamp portion is greater than a thickness of the second connection portion.

10. The keyboard of claim 8, wherein the adjustment member comprises an adjustment portion, a third connection portion, and a fastening portion, the adjustment portion is positioned above the top plate and is exposed through the upper frame via an opening, the third connection portion is connected between the adjustment portion and the fastening portion, the fastening portion is positioned around the elastic clamp unit and configured to clamp the elastic clamp unit so as to fasten the supporting member, and the second elastic element is located between the fastening portion and the first bottom plate.

11. The keyboard of claim 10, wherein each clamp arm comprises an extending portion extending from an end of the clamp portion away from the first bottom plate and parallel to the first bottom plate, and the fastening portion is ring shaped and located between the extending portion of the clamp arm and the second elastic element.

12. The keyboard of claim 11, wherein the third connection portion comprises two L shaped link levers each link lever having a first bar perpendicular to the first bottom plate of the lower frame and a second bar parallel to the first bottom plate, each second bar is connected between the adjustment portion and the first bar, each first bar is connected between the second bar and the fastening portion.

13. An electronic device, comprising:
a display; and
a keyboard, the keyboard comprising:
an upper frame comprising a plurality of first openings;
a main body having a plurality of keys exposed through the upper frame via the plurality first opening;
a lower frame cooperating with the upper frame to fix the main body between the upper frame and the lower frame, the lower frame comprising a first bottom plate defining a though hole; and
an adjustment mechanism fixed on the first bottom plate and configured to adjust an inclined angle of the keyboard, the adjustment mechanism comprising:
an adjustment member configured to be operated by a user;
a supporting member configured to protrude from the first bottom plate via the through hole to support the keyboard on a supporting surface;
a driving member configured to drive the supporting member to move along a central axis of the through hole to adjust a protruding distance of the supporting member when the adjustment member is operated; and
a position stopper configured to resist the supporting member to secure the supporting member when the adjustment member is free.

14. The electronic device of claim 13, wherein the driving member comprises a positioning unit and a first elastic element, the positioning unit is fixed on the upper frame or the lower frame, and the first elastic element is located between the positioning unit and the supporting member.

15. The electronic device of claim 14, wherein the positioning unit comprises a top plate positioned above the through hole and parallel to the first bottom plate and a first connection portion connected between the top plate and the first bottom plate.

16. The electronic device of claim 15, wherein the supporting member comprises a second bottom plate, a side wall extending perpendicularly from the second bottom plate, a receiving space defined by the second bottom plate and the side wall, and an opening opposite to the second bottom plate, and the receiving space receiving the first elastic element via the opening.

17. The electronic device of claim 15, wherein the position stopper comprises a second elastic element and an elastic clamp unit, the elastic clamp unit is arranged around the supporting member and configured to clamp the supporting member to fasten the supporting member when the adjustment member is free, and the second elastic element is a spring around the clamp unit.

18. The electronic device of claim 17, wherein the elastic clamp unit comprises a plurality of clamp arms each arm extending from an edge of the first bottom plate around the through hole to the upper frame, an interval is defined between two adjacent clamp arms, each clamp arm comprises a second connection portion and a clamp portion, and the second connection portion is connected between the first bottom plate and the clamp portion.

19. The electronic device of claim 18, wherein the adjustment member comprises an adjustment portion, a third connection portion, and a fastening portion, the adjustment portion is positioned above the top plate and is exposed through the upper frame via an opening, the third connection portion is connected between the adjustment portion and the fastening portion, the fastening portion is positioned around the elastic clamp unit and configured to clamp the elastic clamp unit so as to fasten the supporting member, and the second elastic element is located between the fastening portion and the first bottom plate.

20. The electronic device of claim 19, wherein each clamp arm comprises an extending portion extending from an end of the clamp portion away from the first bottom plate and parallel to the first bottom plate, and the fastening portion is ring shaped and located between the extending portion of the clamp arm and the second elastic element.

\* \* \* \* \*